March 3, 1942.　　　H. C. BROWN　　　2,274,885
HYDRAULIC BRAKE
Filed April 29, 1940
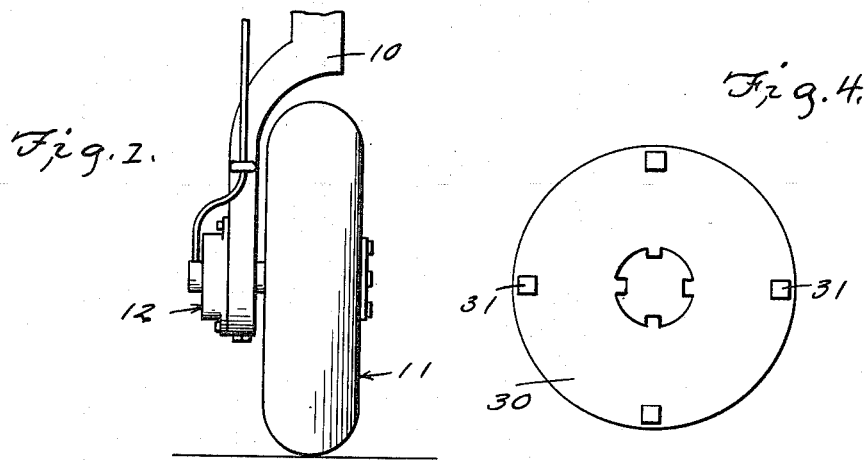
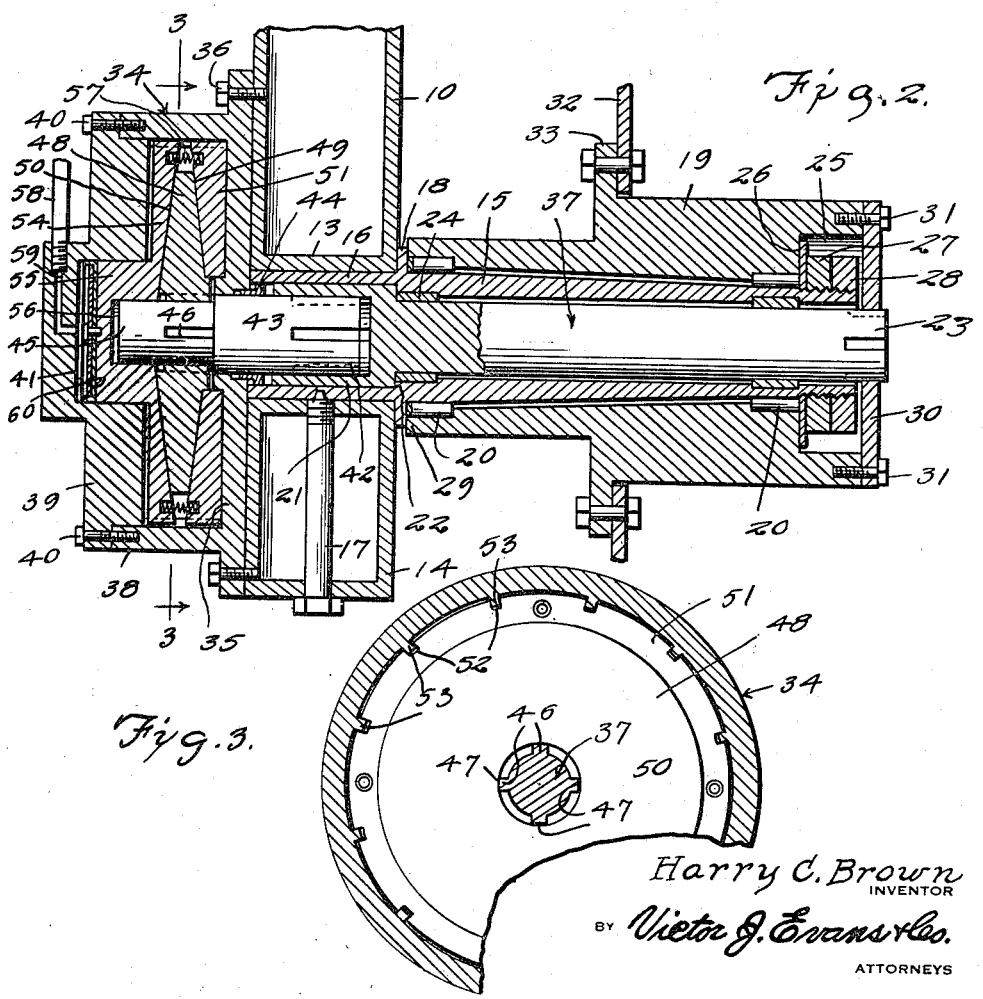
Harry C. Brown
INVENTOR
BY Victor J. Evans & Co.
ATTORNEYS Patented Mar. 3, 1942

2,274,885

UNITED STATES PATENT OFFICE 2,274,885

HYDRAULIC BRAKE

Harry C. Brown, San Antonio, Tex.

Application April 29, 1940, Serial No. 332,390

4 Claims. (Cl. 188—152)

My invention relates to new and useful improvements in brakes.

An important object of my invention is to provide a brake unit that is particularly adapted to be applied to aircraft but that may be associated with any mechanism where a device of this nature has utility.

Another object of my invention is to provide a brake of the above-mentioned character wherein the constituent parts are uniquely arranged and correlated so that the brake may be easily and expeditiously applied to or removed from a wheel and axle assembly as a unit.

Still another object of my invention is the provision of a brake of the above-mentioned character that is simple in its construction to reduce the necessary number of working parts to a minimum and that is strong and rugged in its construction whereby wear and breakage of parts will be reduced to a minimum.

Other objects and advantages of my invention will be apparent during the course of the following description.

In the drawing, forming a part of this specification, and wherein like numerals are employed to designate like parts throughout the same, Figure 1 is a side elevation of a device embodying my invention, and showing the same associated with an airplane wheel and axle assembly, Figure 2 is an enlarged longitudinal sectional view of the same and showing the wheel removed, Figure 3 is a vertical sectional view taken on the line 3—3 of Figure 2, and showing parts broken away, and Figure 4 is an end elevation of the axle and drive plate.

In the accompanying drawing, wherein for the purpose of illustration, is shown a preferred embodiment of my invention, the numeral 10 designates an aircraft landing strut which constitutes a fixed support for the wheel assembly 11 and brake unit 12. As illustrated in Figure 2, the strut is hollow in accordance with conventional aircraft construction and, for the adaptation of the present invention, is provided with a transverse cylindrical bearing wall 13 adjacent the lower end 14 thereof. The axle housing 15 extends laterally of the strut and includes an annular shank portion 16 snugly received by the bearing 13 and held against displacement therein by the elongated set screw 17. The portion of the axle housing extending from the strut is formed with an annular flange 18 which abuts the inner wall of the strut and the longitudinally tapering outer surface thereof receives the hub 19 which is adapted for rotation thereon by the roller bearings 20. The bore of the portion 16 of the axle housing is enlarged so that the enlarged cupular end 21 of the axle 37 will abut the annular shoulder 22 thereby defined, and the shank portion 23 of the axle is supported for rotation by the bronze bearings 24, or the like. The distal end of the hub 19 is formed with a central recess 25 which accommodates a washer 26 and pal nuts 27 and 28 screw-threadedly secured to the free end of the axle housing 15. The hub is adapted to rotate on the axle housing and the manner in which the washer 26 abuts the inner wall of the recess 25 will hold the end 29 of the hub in abutting engagement with the outer face of the flange 18 and against longitudinal axial displacement relative to the housing.

As illustrated in Figure 2, the threaded distal end of the axle housing terminates within the recess 25 while the distal end of the axle shank 23 extends through the recess and substantially beyond the housing. The driving disc 30 is splined to the extending end of the axle and is fixedly associated with the hub by means of the bolts 31. The flange 32 of the wheel is bolted to the radial flange 33 extending from the hub at substantially its middle, whereby rotation of the wheel will transmit such rotation to the hub 19. The hub will rotate freely on the roller bearings 20 and, by virtue of the splined engagement of the drive plate 30 with the axle, the axle will rotate on the bronze bearings 24 within the housing 15.

The brake unit includes a housing 34 formed with a flat circular end wall 35 held in appressed relation with the outer face of the strut by the bolts 36. The annular wall 38 of the brake housing extends from the wall 35 in coaxial relation to the axle 37 and the end wall 39 secured thereto by the bolts 40 is formed with an inner central recess 41 disposed in longitudinal alignment with the cupular end 21 of the axle. The end 42 of the stub shaft 43 is splined within the cupular end 21 of the axle and is adapted to have an essentially free sliding movement therein; the main portion of the shaft, however, extends therefrom and into the housing through the stuffing gland 44. The portion 45 of the stub shaft received by the housing is of reduced diameter and is formed with circumferentially spaced splines 46 adapted to be slidably pressed into the grooves 47 in the friction disc 48. The opposite faces 49 and 50 of the disc taper toward the periphery thereof and the peripheral edge is spaced substantially inwardly from the wall 38 of the housing.

The pressure plate 51 is disposed within the housing between the wall 35 and the face 49 of the friction plate. The peripheral edge of the pressure plate is provided at spaced intervals therearound with grooves 52 adapted to slidably receive the splines 53 extending from the inner face of the wall 38. A companion pressure plate 54 is arranged within the housing between the face 50 of the friction disc and the end wall 39. The peripheral edge of the plate 54 is similarly grooved to slide on the splines 53 and the laterally extending shank 55 is formed thereon and slidably received within the central recess 41 and the end wall 39. The end 45 of the stub shaft 43 is, in turn, journaled for limited sliding movement within the recess 56 in the inner face of the pressure plate 54.

The friction disc 48 is fixedly associated with the stub shaft, the pressure plates 51 and 54 are slidable within the housing on the splines 53 and the stub shaft is permitted a slight axial movement within the end 21 of the axle. A plurality of circumferentially spaced coil springs 57 have their opposite ends seated in aligning recesses in the confronting faces of the pressure plates beyond the peripheral edge of the friction disc to hold the pressure plates normally disengaged from the faces 49 and 50 of the disc.

Axial movement of the pressure plate 54 is controlled by a hydraulic fluid introduced into the fluid chamber defined by the portion of the recess 41 rearwardly of the shank 55 of the plate. The conduit 58 leads from any suitable source of fluid pressure and discharges into the passage 59 which, in turn, communicates centrally with the fluid chamber. A leather cup 60 is secured to the face of the shank 55 and has a close fitting peripheral engagement with the walls of the fluid chamber to prevent escape of the fluid from the chamber when the same is forced therein under pressure.

It may thus be seen that rotation of the axle 37 will effect the rotation of the stub shaft 43 and of the friction disc 48 splined thereon. The friction disc is normally freely rotatable between the pressure plates by reason of the fact that the coil springs 47 normally force the plates a sufficient distance apart to prevent engagement thereof with the faces 49 and 50 of the disc.

When it is desired to apply the brakes, fluid is introduced under pressure into the fluid chamber to move the pressure plate 54 axially within the housing and into frictional engagement with the face 50 of the disc. The disc is fixedly secured to the stub shaft and inward movement of the pressure plate 54 will move the friction disc and shaft axially to bring the disc into frictional engagement with the pressure plate 51. The mutually binding engagement of the pressure plates and friction disc will prevent the free rotation of the disc. It is obvious that a certain amount of slippage will be initially permitted between the disc and pressure plates to permit the operator to gradually check the speed of rotation of the axle. The rate at which the rotation will be checked will depend upon the pressure effected within the pressure chamber of the recess 41.

The brake unit 12 may be easily detached from the strut 10 and the wheel and axle assembly 11, such detachment being effected by the simple expedient of removing the bolts 36. The brake unit may then be moved axially away from the strut to disengage the splined end 42 of the stub shaft from the cupular end 21 of the axle. The unique association of the brake unit and the wheel and axle assembly permits a new brake unit to be easily and expeditiously substituted for one that has become worn or defective. By virtue of the relatively large surface between the confronting faces of the stator pressure plates and the rotor friction disc, the entire brake unit may be assembled in a relatively small housing and without, in any way, sacrificing the efficacy of the braking action.

It is to be understood that the form of my invention, herewith shown and described, is to be taken as a preferred example of the same, and that various changes in the size, shape and arrangement of parts may be restorted to without departing from the spirit of my invention, or scope of the appended claims.

Having thus described my invention, I claim:

1. In a wheel structure including a fixed support and an axially recessed axle member journaled for rotation in said support, a braking unit for the axle comprising a fixed housing having a fluid chamber detachably secured to the support, a plurality of relatively movable discs coaxially arranged within said housing, a rotatably driven shaft splined for limited sliding movement within the axial recess of the axle and received by the housing, certain of the discs being connected to and movable with the shaft and other of the discs being slidably associated with the housing and fluid chamber, hydraulic means connected with the fluid chamber to move the confronting faces of the discs into frictional engagement, and means to automatically separate the discs after each operation of the first means.

2. In a wheel structure including a fixed support and an axle journaled for rotation in said support, a braking unit for the axle comprising a housing adapted to be detachably secured to the support, a shaft in said housing adapted to be detachably coupled to the axle and to have a limited axial movement relative thereto, a friction disc rotatable with the shaft, discs coaxially arranged in confronting relation at the opposite sides of the friction disc and associated with said housing for axial sliding movement therein, means to slidably actuate all of said discs into mutually binding engagement, and means to automatically disengage the discs after each operation of the said first means.

3. In a wheel structure including a fixed support and an axle journaled for rotation in said support, a braking unit for the axle comprising a housing adapted to be detachably secured to the support laterally thereof, said housing having a fluid chamber arranged adaxially of the axle, a shaft in said housing adapted to be detachably coupled to the axle and to have a limited axial movement relative thereto, a friction disc rotatable with the shaft, discs coaxially arranged in confronting relation at the opposite sides of the friction disc and associated with said housing for axial sliding movement therein, one of said discs having a shank slidably received by the fluid chamber to close one end of the same and a recess to slidably accommodate one end of the shaft, and a hydraulic means communicating centrally with the said fluid chamber to slidably actuate all of said discs into mutually binding engagement.

4. In a wheel structure including a fixed support and an axle journaled for rotation in said support, a braking unit for the axle comprising a housing adapted to be detachably secured to the support laterally thereof, said housing having a fluid chamber arranged adaxially of the axle, a shaft in said housing adapted to be detachably coupled to the axle and to have a limited axial movement relative thereto, a friction disc rotatable with the shaft, discs coaxially arranged in confronting relation at the opposite sides of the friction disc and associated with said housing for axial sliding movement therein, one of said discs having a shank slidably received by the fluid chamber to close one end of the same and a recess to slidably accommodate one end of the shaft, and a hydraulic means communicating centrally with the said fluid chamber to slidably actuate all of said discs into mutually binding engagement, and means to automatically disengage the discs after each operation of the said hydraulic means.

HARRY C. BROWN.